US010860289B2

(12) United States Patent
Young (10) Patent No.: US 10,860,289 B2
(45) Date of Patent: Dec. 8, 2020

(54) FLEXIBLE VOICE-BASED INFORMATION RETRIEVAL SYSTEM FOR VIRTUAL ASSISTANT

(71) Applicant: ANSWER ANYTHING, LLC, Carnation, WA (US)

(72) Inventor: Dana Young, Seattle, WA (US)

(73) Assignee: ANSWER ANYTHING, LLC

( * ) Notice: Subject to any disclaimer, the term of this patent is extended or adjusted under 35 U.S.C. 154(b) by 476 days.

(21) Appl. No.: 15/669,542

(22) Filed: Aug. 4, 2017

(65) Prior Publication Data

US 2019/0042185 A1    Feb. 7, 2019

(51) Int. Cl.
| | |
|---|---|
| *G06F 3/16* | (2006.01) |
| *G06F 3/0482* | (2013.01) |
| *G10L 15/22* | (2006.01) |
| *G06F 16/9032* | (2019.01) |
| *G06N 3/00* | (2006.01) |
| *G06F 40/35* | (2020.01) |
| *G06F 40/174* | (2020.01) |
| *G10L 15/18* | (2013.01) |
| *G06N 20/00* | (2019.01) |
| *G06F 17/00* | (2019.01) |

(52) U.S. Cl.
CPC ............ *G06F 3/167* (2013.01); *G06F 3/0482* (2013.01); *G06F 16/90332* (2019.01); *G06F 40/174* (2020.01); *G06F 40/35* (2020.01); *G06N 3/006* (2013.01); *G10L 15/22* (2013.01); *G06N 20/00* (2019.01); *G10L 15/18* (2013.01); *G10L 2015/223* (2013.01)

(58) Field of Classification Search
CPC .. G06F 3/167; G06F 17/279; G06F 16/90332; G06F 17/243; G06F 3/0482; G06F 17/27; G06N 3/006; G06N 20/00; G10L 15/22; G10L 2015/223; G10L 15/18
See application file for complete search history.

(56) References Cited

U.S. PATENT DOCUMENTS

2015/0186155 A1*   7/2015   Brown ............... G06F 3/04817
                                                   715/706
2018/0314689 A1*  11/2018   Wang .................. G10L 15/1822

OTHER PUBLICATIONS

"Intents," API.AI, Jul. 26, 2017, <https://api.ai/docs/intents#fallback_intents> [retrieved Aug. 1, 2017], 13 pages.

(Continued)

*Primary Examiner* — Quoc A Tran
(74) *Attorney, Agent, or Firm* — Christensen O'Connor Johnson Kindness PLLC (57) ABSTRACT

A customization portal provides an interface for customizing an implementation of a voice-based information retrieval system executed by a virtual assistant. The virtual assistant has been previously trained for natural language understanding (NLU) of speech input indicating selection of some menu items. For other menu items, the customization portal allows the use of context-independent signifiers (e.g., letters or numbers) or custom signifiers (e.g., free-form text) that avoid the need for NLU with respect to selection of those menu items. This approach allows the system to provide a natural-feeling conversation for the user, while also providing the flexibility to present custom menu choices and content to a user without specialized NLU training.

20 Claims, 8 Drawing Sheets

(56) References Cited

OTHER PUBLICATIONS

Owner Portal—Vacation Rental Virtual Concierge: Instructions, <https://conciergeserviceportal.com/#instructions> [retrieved Jul. 12, 2017], 2 pages.

Owner Portal—Vacation Rental Virtual Concierge: The Residence (main page), <https://conciergeserviceportal.com/> [retrieved Jul. 26, 2017], 1 page.

Owner Portal—Vacation Rental Virtual Concierge: Things to Do, <https://conciergeserviceportal.com/> [retrieved Jul. 26, 2017], 1 page.

Palermo, M., "Why a Custom Slot Is the Literal Solution," Alexa Blogs, Jan. 25, 2017, <https://developeramazon.com/blogs/post/Tx3IHSFQSUF3RQP/why-a-cu.../> [retrieved Aug. 1, 2017], 3 pages.

Sky Class: Alexa Skills, Amazon.com, © 2017, <https://www.amazon.com/dp/B071L6KQYH/> [retrieved Aug. 1, 2017], 2 pages.

Young, D., "Vacation Rental Virtual Concierge: A Customized Virtual Concierge for Your Vacation Rental,"© 2017, <http://vacationrentalvirtualconcierge.com/#signs> [retrieved Jul. 12, 2017], 4 pages.

Young, D., "Vacation Rental Virtual Concierge: Alexa Skills," Amazon.com, © 2017, <https://www.amazon.com/Dana-Young-Vacation-Virtual-Concierge/dp/B. . . > [retrieved Jul. 12, 2017], 3 pages.

Young, D., "Vacation Rental Virtual Concierge: Alexa Skills," Amazon.com, © 2017, <https://www.amazon.com/dp/B06XBKX16N> [retrieved Jul. 12, 2017], 4 pages.

* cited by examiner

▣ SAVE     ⌕ INSTRUCTIONS    ▤ MY INPUTS    ⛂ MY GUESTS    ⏻ SIGN OUT

WELCOME

FOR EACH QUESTION, PLEASE PROVIDE ANSWERS TO DELIVER TO YOUR GUESTS.
EXAMPLES ARE PROVIDED FOR EACH ITEM.
FOR MORE INFORMATION, SEE INSTRUCTIONS IN THE MENU ABOVE.

[ THE RESIDENCE ]   [ PLACES IN THE AREA ]   [ THINGS TO DO ]   [ MORE DETAILS ]

THE RESIDENCE

WHAT TYPE OF PROPERTY DO YOU HAVE?
| HOUSE |

WHAT IS THE NAME OF YOUR PLACE?
| THE LODGE AT PALMER LAKE |

OPTIONAL: WOULD YOU LIKE TO PROVIDE YOUR GUESTS ACCESS TO THE CONCIERGE ON THEIR PHONE? IF SO, ENTER A 4-DIGIT PASSCODE (SEE INSTRUCTIONS)
| 1234 |

TELL ME ABOUT ARRIVAL
| Upon arrival, please call the property manager to … |

[ EXCLUDE THIS ITEM − ]

TELL ME ABOUT THE DEPARTURE
[ INCLUDE THIS ITEM + ]

WHAT WOULD YOU LIKE TO SHARE AS A GROUP ORIENTATION?
[ INCLUDE THIS ITEM + ]

TELL ME ABOUT WIFI (OR CONNECTING TO THE INTERNET)
[ INCLUDE THIS ITEM + ]

TELL ME ABOUT CLIMATE CONTROL
[ INCLUDE THIS ITEM + ]

TELL ME ABOUT MAKING CALLS
[ INCLUDE THIS ITEM + ]

TELL ME ABOUT SOME OTHER THINGS ABOUT THE RESIDENCE THAT ARE IMPORTANT TO KNOW
[ INCLUDE THIS ITEM + ]

*FIG. 3*

![SAVE] ![INSTRUCTIONS] ![MY INPUTS] ![MY GUESTS] ![SIGN OUT]

WELCOME

FOR EACH QUESTION, PLEASE PROVIDE ANSWERS TO DELIVER TO YOUR GUESTS.
EXAMPLES ARE PROVIDED FOR EACH ITEM.
FOR MORE INFORMATION, SEE INSTRUCTIONS IN THE MENU ABOVE.

[ THE RESIDENCE ]   [ PLACES IN THE AREA ]   [ THINGS TO DO ]   [ MORE DETAILS ]

THINGS TO DO
TELL ME A CATEGORY/COLLECTION OF THINGS TO DO IN THE AREA

CATEGORY 1
| Palmer Lake |

BRIEFLY SUMMARIZE CATEGORY 1
| Palmer Lake covers 21 hundred acres, is about 5 miles long and 80 feet deep. |

[ ADD AN ITEM TO THIS CATEGORY + ]

[ REMOVE THIS CATEGORY - ]

[ ADD A CATEGORY + ]

---

TELL ME ABOUT SOME OTHER THINGS TO DO IN THE AREA
[ ADD AN ITEM + ]

FLEXIBLE VOICE-BASED INFORMATION RETRIEVAL SYSTEM FOR VIRTUAL ASSISTANT

BACKGROUND

Today, computing devices provide users with the ability to obtain information in an increasing variety of ways. One technique that is becoming increasingly popular is to engage in a spoken dialog with a voice-enabled virtual assistant, such as Siri, available from Apple Inc., Google Assistant, available from Google Inc., or Alexa, available from Amazon.com, Inc. Virtual assistants are typically geared towards general consumer use such as computer-assisted searching, purchasing items, and other general tasks. In a typical scenario, a user speaks a "wake word" to activate the virtual assistant, followed by a question or command. In response, the virtual assistant uses natural language processing ("NLP") to parse the user's statement and query a database, or a collection of databases, to obtain a response to the question. The response is formulated in text that is processed and output as a synthesized voice (e.g., via a smart phone or smart speaker, such as the Echo, available from Amazon.com, Inc., or Google Home, available from Google Inc.). The user can then end or continue the dialog.

As its name implies, NLP refers to processing of natural human language, within the broader context of automatic speech recognition (ASR). ASR includes basic processing such as automatic speech-to-text (STT) processing, in addition to more specialized processing, such as NLP. In turn, natural language understanding ("NLU") refers to more advanced processing of natural human language, within the broader context of NLP. NLU concepts include semantic parsing, paraphrasing and summarization, natural language inference, and dialogue agents. NLP concepts that do not rise to the level of NLU include part-of-speech tagging, named entity recognition, text categorization, and syntactic parsing.

Some virtual assistants use NLU to parse statements or questions in an effort to formulate a suitable response. NLU involves not just speech-to-text translation or recognition of keywords, but some level of understanding of the meaning of human speech. In the context of a virtual assistant, NLU logic provides a means by which a user is able to engage in a natural dialog with a computer to obtain the desired information.

Computers do not have the ability to understand the correct context of speech, or provide appropriate responses to users' statements or questions, without specialized training. Therefore, in order to be effective, applications based on NLU require prior knowledge of what may be asked by a user. For this reason, NLU is typically employed for a narrow range of general tasks that are generally applicable to a wide variety of users, such as Internet searching, playing music, making lists, placing calls, composing messages, updating calendars, or purchasing items.

Once trained, a computer with NLU functionality will attempt to match a statement or question with a context that it has been programmed to understand. For example, a user may say, "Set a timer for five minutes." A virtual assistant that has been programmed to set timers may note the presence of the words "set," "timer," and "five minutes" in this statement, and respond by setting timer that expires in five minutes. This is an example of a broadly applicable context that could potentially be of value to any user, regardless of the user's location or situation.

On the other hand, a user in a building may ask, "Where is the nearest exit?" A virtual assistant that has been programmed to employ NLU for general tasks will not be able to provide a useful response for this question. A useful response requires specialized training and programming. Although programming of this nature is achievable, it is also time-consuming and expensive and raises several technical problems to overcome. For example, a software developer who knows generally what a user may ask must expand the potential ways the user's intent might be verbalized and train the NLP engine to handle them effectively. In the situation illustrated above, a usable system should be able to respond to "Where is the nearest exit?" as well as variations such as, "How do I get out of this building?" In addition, a usable system should be able to adjust its responses if the facts change. In the situation illustrated above, if an exit becomes unusable due to construction in the building, the software must be programmed to suggest a different exit. Thus, there are substantial technical barriers to implementing and maintaining a system of this nature.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a computer system presents a user interface for customizing an implementation of a voice-based information retrieval system for a virtual assistant with natural language understanding (NLU) functionality. The computer system receives first customization input via the user interface, comprising information to be outputted by the virtual assistant in response to NLU, by the virtual assistant, of a first speech input (e.g., a spoken phrase, sentence, or question) indicating selection of a first menu item. The virtual assistant has been previously trained for NLU of the first speech input.

The computer system receives second customization input via the user interface, comprising a representation of a second menu item (e.g., a custom signifier or a context-independent signifier, such as a letter or number) and information to be outputted by the virtual assistant in response to detection, by the virtual assistant, of a second speech input (e.g., a spoken word, letter, or number) that matches the representation of the second menu item. The virtual assistant has not been previously trained for NLU of the second speech input.

The computer system updates the implementation of the voice-based information retrieval system based on the received customization inputs. The updating comprises including the first menu item, the second menu item, and the respective information to be outputted in the voice-based information retrieval system.

The representation of the second menu item may include free-form text input. The second speech input may be matched with the free-form text input by translating the second speech input into text and comparing the translated text with the free-form text input.

The virtual assistant may be executed by a mobile computing device, such as a smart phone, or a voice-enabled smart speaker. The voice-based information retrieval system may be implemented as a virtual concierge service for a hotel or rental property.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

Embodiments of the present disclosure are generally directed to a voice-based information retrieval system for a virtual assistant with natural language understanding (NLU) functionality. In described embodiments, a customization portal provides an interface for customizing an implementation of the voice-based information retrieval system. The virtual assistant has been previously trained for NLU of speech input indicating selection of some menu items. For other menu items, the customization portal allows the use of context-independent signifiers (e.g., letters or numbers) or custom signifiers (e.g., free-form text) that avoid the need for NLU with respect to selection of those menu items. This approach allows the system to provide a natural-feeling conversation for the user, while also providing the flexibility to present custom menu choices and content to a user without specialized NLU training.

Consider a scenario in which a user has recently arrived in a vacation rental home equipped with a voice-enabled speaker and virtual assistant. The user wants to know what time they must leave the home on check-out day. In an attempt to discover the check-out time, the user may ask, "When is check-out time?" Because this question may be generally applicable across a broad range of properties, a virtual assistant to be deployed in rental homes may be preprogrammed to recognize and respond to this question with the appropriate information.

The user is also planning to watch a movie and wants to know if there is a home theater sound system available. In an attempt to find the sound system, the user may ask, "Where is the sound system?" This question has no useful responses without knowledge of the specific context of the question, as well as the features and layout of the home in which the question is asked. Therefore, a useful response would typically require specialized training and programming. Such programming may allow a virtual assistant to interpret "Where is the sound system?" as a request about the presence and location of the sound system in that rental home, and to provide a response such as, "The sound system is located in the cabinet near the TV in the living room." However, in order to provide this functionality, the virtual assistant must be programmed to understand the context of the user's question, as well as provide the correct information to respond to the question.

Although programming of this nature is achievable, it is also time-consuming and expensive and raises several technical problems to overcome. For example, a software developer who knows generally what a user may ask must expand the potential ways the user's intent may be verbalized and train the NLP engine to handle them effectively. In the situation illustrated above, a usable system should be able to handle "Where is the sound system?" as well as variations such as, "Tell me where the home theater system is." Yet, this effort would be wasted for deployment in homes that lack a home theater system. Furthermore, if additional needs arise, the software must be reprogrammed to handle them. If a new projector is installed in a media room in the rental home, the software must be reprogrammed to not only recognize new vocabulary such as "projector," but to recognize and answer common questions about it, such as how to turn it on and off. Thus, there are substantial technical barriers to implementing and maintaining a system of this nature.

Described embodiments overcome technical problems of previous systems in these and other scenarios. For example, a described system provides the ability to service many use cases without requiring extensive reprogramming for each use case. The system provides for separation of navigation (e.g., how a user navigates an information retrieval menu) from contextual content. This separation may include full separation or partial separation. In either case, specific contextual content for a given use case (e.g., a set of questions or statements to be recognized) need not be embedded in the core application. Instead, an approach to navigation is used that allows contextual content to be provided via a customization portal and dynamically imported (e.g., at runtime) into an implementation of a voice-based information retrieval system. A client device (e.g., a smart speaker implementing a virtual assistant) can then provide a customized interactive voice-based information retrieval experience for a given use case without extensive reprogramming of the system.

In embodiments described herein, a hierarchical framework establishes a way to navigate an interactive voice experience with flexibility to present choices to a user with context-independent signifiers (e.g., letters or numbers) that do not require specialized NLU training. This framework allows for a full-separation approach, presented entirely with context-independent signifiers. However, this framework also allows for a partial-separation approach to incorporate high level constructs of a given set of use cases (e.g., with specialized NLU training for recognition of and responses to statements, phrases, or questions in a particular context) along with context-independent signifiers.

In an illustrative architecture, an intent is a software function that executes in response to a user's voice input (e.g., a question, statement, letter, or number). The intent provides a particular item of contextual content to be delivered in response to the user's voice input. The architecture also maintains a navigation state to manage navigational options.

In described embodiments, menu items are paired with contextual content. It is possible to create a one-to-one mapping between each element in a menu navigation framework (e.g., each node in a menu tree) and a piece of content that can be dynamically imported at runtime. In order to allow custom content to be defined without reprogramming the application, an interface is provided that can be accessed and used by a non-technical person. The interface can be provided as a web-based portal, with corresponding content stored in a database. An administrator (e.g., a property manager or owner) may access and provide contextual content via the portal with any suitable computing device, such as a smart phone, tablet, or a notebook or desktop computer that is connected to the Internet.

In a full-separation approach or a partial-separation approach for a voice-based information retrieval system, the system may dynamically import contextual content (e.g., at runtime) and map it into an implementation of the voice-based information retrieval system. In a full-separation approach, all options are spoken to the user as context-independent signifiers (e.g., as option "one," "two," or "three," or option "A," "B," or "C") paired with contextual content. One benefit of a full-separation approach is the broad range of customizations and use cases that may be supported.

For example, a virtual assistant may say, "Welcome to the resort information system. Say 'one' for resort features; say 'two' for resort events." The user speaks the signifier (e.g., number or letter) of interest, and navigates down the option tree, where further context-independent signifiers may be presented along with contextual content. For example, in response to a user saying "one" in the example above, the virtual assistant may say, "Resort features: Say 'one' for information about the spa; say 'two' for information about the golf course." This process may continue to whatever depth of information is provided on a particular item or sub-item. In addition, an option may be provided for the user to return to a previous level in the menu without making a particular selection. When the final level is reached on a particular item or sub-item, the system presents the contextual content to the user pertaining to that particular item or sub-item. For example, after the user selects an option for operating hours of the spa, the system may say, "Spa hours: The spa is open from 9 a.m. to 5 p.m. daily." The system may then return to the previous level in the menu, return to the top of the menu, await further input from the user, or take some other action.

In a partial-separation approach for a voice-based information retrieval system, some options are represented by context-independent signifiers (e.g., as option "one," "two," or "three," or option "A," "B," or "C") or custom signifiers paired with contextual content, but the system is also specifically trained, in part, for NLU of voice input in a particular context. For example, in the context of a vacation rental home, a virtual assistant may say, "Welcome. Would you like to hear about the house, places in the area, things to do, or more choices?" Or, in a less-directed way, the virtual assistant may say, "I can tell you more about this home, the surrounding area, things to do, or other topics. What would you like to know?" The user may respond with a statement or phrase indicating an item of interest and navigate down the option tree, where further options may be presented along with further contextual content. These further options may be represented by context-independent signifiers or in a context-dependent way. For example, in response to a user saying "tell me about the home" in the example above, the virtual assistant may say, "OK, I can tell you more about the home. Would you like to hear about check-in and check-out, house features, a general overview, or something else?" If the user says "tell me something else" or "let me hear some more choices," the virtual assistant may say, "More choices: Say 'one' for garbage and recycling; say 'two' for sound system." In addition, an option may be provided for the user to return to a previous level in the menu without making a particular selection.

This process may continue to whatever depth of information is provided on a particular item or sub-item. When the final level is reached on a particular item or sub-item, the system presents the contextual content to the user pertaining to that particular item or sub-item. For example, if the user says "one" in the example above, the virtual assistant may say, "Garbage and recycling: The bins are stored in the garage and should be left at the curb for pickup by 7 a.m. on Tuesday morning." The system may then return to the previous level in the menu, return to the top of the menu, await further input from the user, or take some other action.

One benefit of a partial-separation approach is to provide a more natural conversation experience for the user, while also allowing for the customization and flexibility afforded by context-independent signifiers. Instead of only responding with numbers or letters, users can say words (e.g., in the form of questions, statements, or phrases) that describe what they are looking for.

Figure 1:
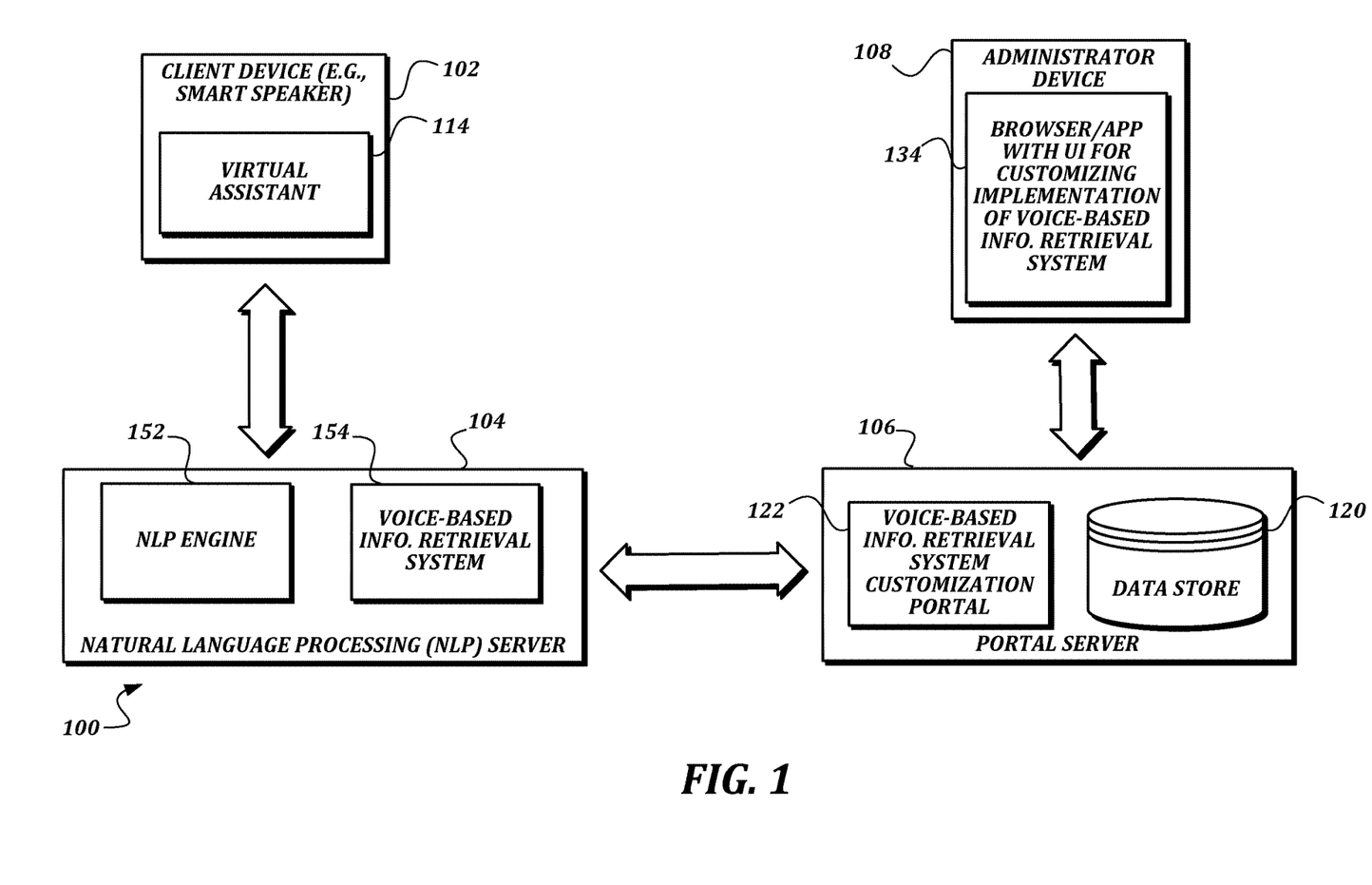
FIG. 1 is a block diagram of a computer system in which described embodiments may be implemented.

FIG. 1 is a block diagram of a computer system in which described embodiments may be implemented. In the example shown in FIG. 1, the system 100 includes a client device 102 (e.g., a smart speaker), a natural language processing (NLP) server 104, a portal server 106, and an administrator device 108. The client device 102 implements a virtual assistant 114 that communicates with the NLP server 104, which implements an NLP engine 152 and a voice-based information retrieval system 154. The NLP engine 152 provides functionality for NLU of at least some speech input provided to the virtual assistant 114 for interacting with the voice-based information retrieval system 154. The NLP server 104 also communicates with the portal server 106, which implements a customization portal 122 for the voice-based information retrieval system and includes a data store 120. The portal server 106 also communicates with an administrator device 108, which provides an interface 134 (e.g., via a web browser or custom application) for customizing an implementation of the voice-based information retrieval system.

Many alternatives to the arrangement shown in FIG. 1 are possible. For example, although a single client device and a single administrator device are shown for ease of illustration, it should be understood that the system can be easily extended to accommodate multiple client devices and multiple implementations of the voice-based information retrieval system, as well as multiple administrator devices. Multiple client devices may access the same implementation of the voice-based information retrieval system, or such devices may access different implementations (e.g., for different rental homes or resorts). Multiple administrator devices may access the same customization portal to customize the same implementation of the voice-based information retrieval system, or such devices may access different portals to customize different implementations. As another example, although the client device 102 is shown as implementing the virtual assistant 114 for purposes of illustration, it should be understood that functionality of the virtual assistant may be distributed across multiple computing devices, such as where the NLP engine 152 includes NLP functionality for the virtual assistant. As another example, although the NLP server 104 and the portal server 106 are illustrated as single servers in FIG. 1, it should be understood that the functionality provided by these each of these servers may, alternatively, be distributed across multiple computing devices. In one illustrative scenario, the functionality of the portal server 106 may be provided by a first server (or a set of multiple servers) that implements the customization portal 122 and a second server (or a set of multiple servers) that hosts the data store 120. In another illustrative scenario, the functionality of the NLP server 104 may be provided by a first server (or set of multiple servers) that implements the NLP engine 152 and a second server (or set of multiple servers) that hosts the voice-based information retrieval system 154.

Figure 2:
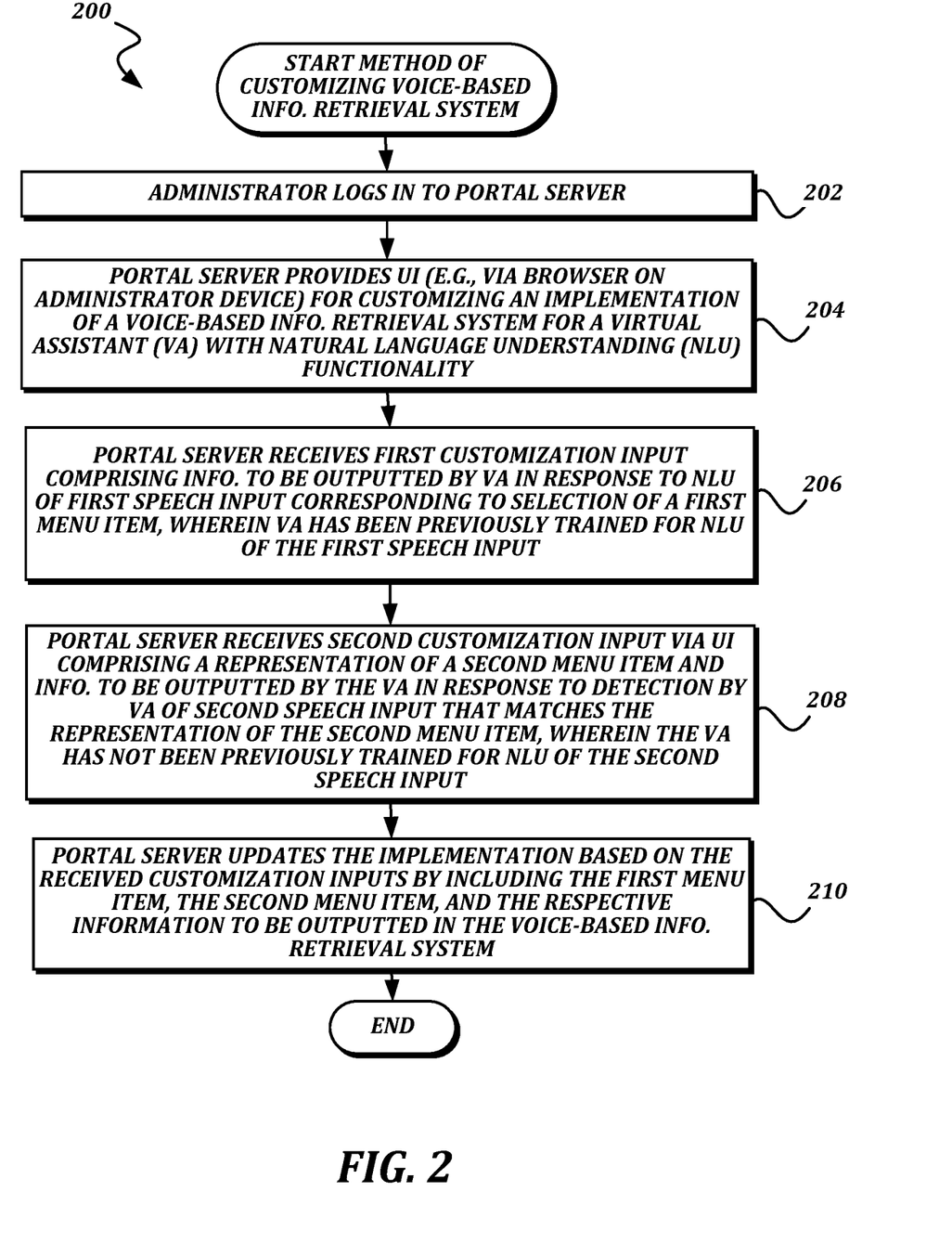
FIG. 2 is a flow chart of an illustrative process for customizing an implementation of a voice-based information retrieval system.

FIG. 2 is a flow chart of an illustrative process for customizing an implementation of a voice-based information retrieval system. The process 200 begins at step 202, in which an administrator (e.g., via administrator device 108) logs in to a customization portal (e.g., via portal server 106). At step 204, the customization portal provides a user interface (e.g., via a browser executing on the administrator device 108) for customizing an implementation of a voice-based information retrieval system for a virtual assistant with NLU functionality. The virtual assistant may be implemented in a computing device such as a smart speaker or smart phone. At step 206, the customization portal receives first customization input via the user interface. The first customization input comprises information to be outputted by the virtual assistant in response to NLU of first speech input (e.g., a spoken phrase, sentence, or question) indicating or corresponding to selection of a first menu item. The virtual assistant has been previously trained for NLU of the first speech input.

At step 208, the customization portal receives second customization input via the user interface. The second customization input comprises a representation of a second menu item (e.g., a custom signifier, such as free-form text input, or a context-independent signifier, such as a letter or number) and information to be outputted by the virtual assistant in response to detection by the virtual assistant of second speech input (e.g., one or more spoken words) that matches the representation of the second menu item. The second menu item may be a sub-item of the first menu item.

In this example, although the virtual assistant may have been previously programmed or trained to recognize, for example, an uttered number or letter in the second speech input that corresponds to the representation of the second menu item, the virtual assistant has not been previously trained for NLU of the second speech input. Instead, the virtual assistant may use other techniques that do not rise to the level of NLU to detect a match. For example, the virtual assistant may use speech-to-text processing to convert the second speech input to text, and comparing the resulting text with the representation of the second menu item to determine if there is a match.

At step 210, the portal server updates the implementation of the voice-based information retrieval system (e.g., at runtime when a user of a client device initiates the voice-based information retrieval system) based on the received customization inputs. The portal server includes the first menu item, the second menu item, and the respective information to be outputted in the updated implementation of the voice-based information retrieval system.

Many alternatives to the process described above are possible. For example, the portal server may receive additional customization input corresponding to additional menu items in the implementation of the voice-based information retrieval system. As another example, although the steps of FIG. 2 may occur in a single customization session, these steps and other steps may also occur over multiple customization sessions, from a single administrator device or multiple administrator devices.

In described embodiments, the customization portal provides a set of individual content fields structured to match the logic of the application. The portal provides instructions and a user interface (e.g., via a web browser or custom application) to allow the user to enter specific use case content into the fields. Fields may be organized in different ways. In at least one embodiment, fields are organized as pairs including a menu item or category and a corresponding description. This approach allows the voice-based information retrieval system logic to present menu items to the user as options and deliver descriptions when the menu item is selected by the user. In some situations, the system may provide descriptions along with another set of menu items in a single output. For example, if a user selects a menu item corresponding to lake activities at a rental home, the virtual assistant may recite a description of the lake and then recite specific menu items (e.g., "canoeing" or "fishing") that may be included in this category.

Fields may be implemented different ways. For example, custom content such as free-form text may be entered in both fields of a pair (e.g., a signifier of the menu item and the corresponding description). As another example, custom content may be provided for the description while the menu item is pre-established for a particular use case.

Menu items and their corresponding content can be dynamically included in or excluded from an implementation of the voice-based information retrieval system. This flexibility provides a way for the structure of the system to be broadly applicable across many use cases. For example, when an administrator excludes an item/description pair, the options presented to the user at runtime may be dynamically reduced. Further, higher level menus can be collapsed and consolidated depending on the pairs that are excluded. These steps can immediately improve the efficiency of the system without reprogramming.

Figure 3:
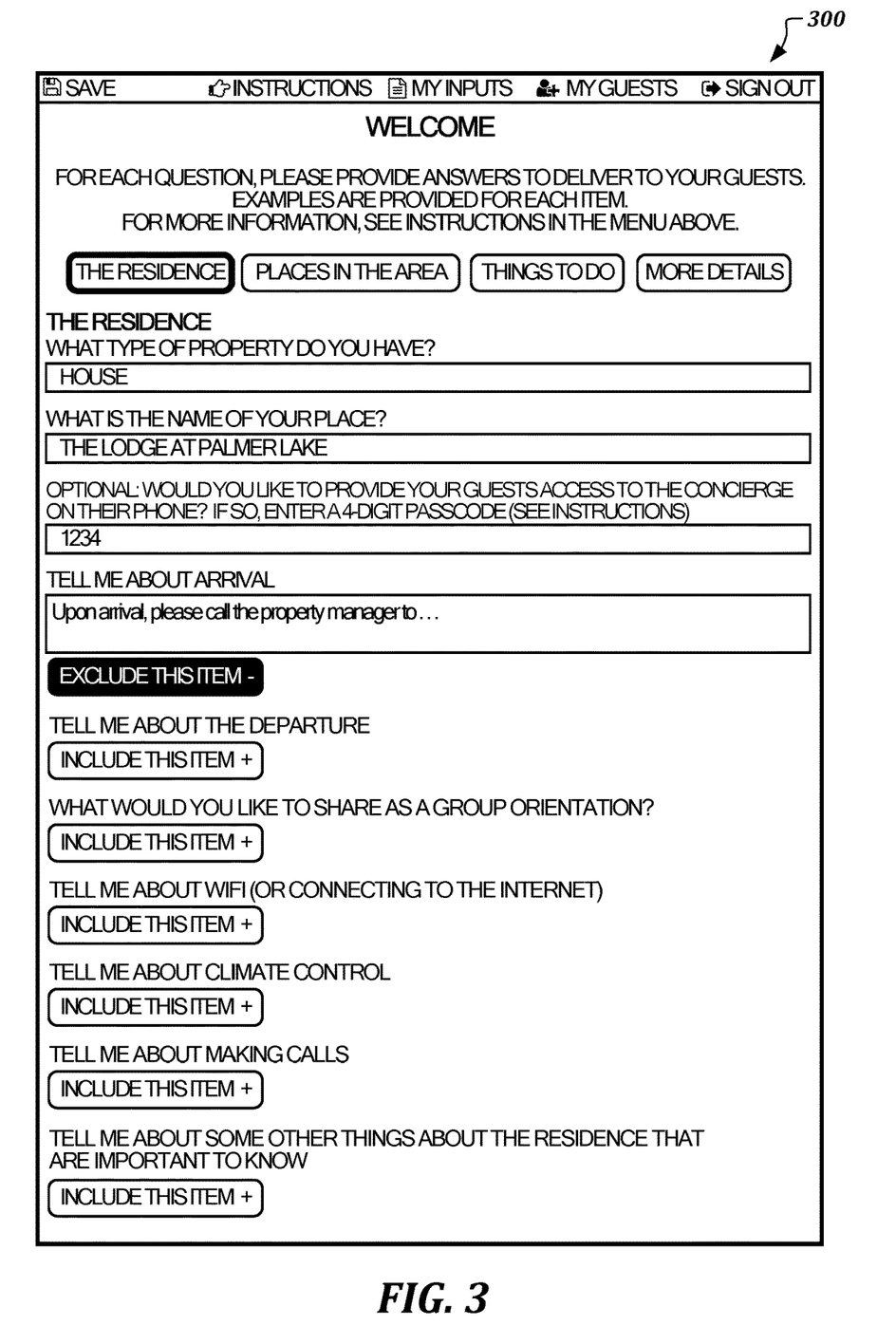
FIG. 3 is a screenshot diagram of a section of an illustrative user interface for customizing an implementation of a voice-based information retrieval system.

FIG. 3 is a screenshot diagram of a section of an illustrative user interface for customizing an implementation of a voice-based information retrieval system. The illustrative user interface 300 may be presented, for example, in a web browser or custom application executing on a computing device, such as the administrator device 108 of FIG. 1. In the illustrative section shown in FIG. 3, the user interface 300 includes fields relating to a residence, such as fields for indicating a property type, a name of the property, and a code to access the voice-based information retrieval system (referred to as a "concierge" in this example) via a smartphone as a possible supplement a smart speaker located on the property. The interface 300 also includes elements (e.g., buttons) for indicating menu items to include or exclude in a customized implementation of the system. In this example, the field "tell me about arrival" is currently included, with a button that can be activated to exclude that item, if desired.

Other fields, such as "tell me about departure," are not currently included but have buttons that can be activated to include that item, if desired.

In the example shown in FIG. 3, a virtual assistant has been previously trained for NLU of speech input corresponding to selection the menu items shown, such that statements related to the menu items can be recognized and understood by the virtual assistant. For example, in response to NLU of speech input such as "tell me about arrival," the virtual assistant can speak the text in the text box provided in the "tell me about arrival" field.

Another construct that may be enabled by the portal is a category of item/description pairs. In described embodiments, the user interface provides the ability to include or exclude categories, as well as the ability to add item/description pairs to a particular category.

Figure 4:
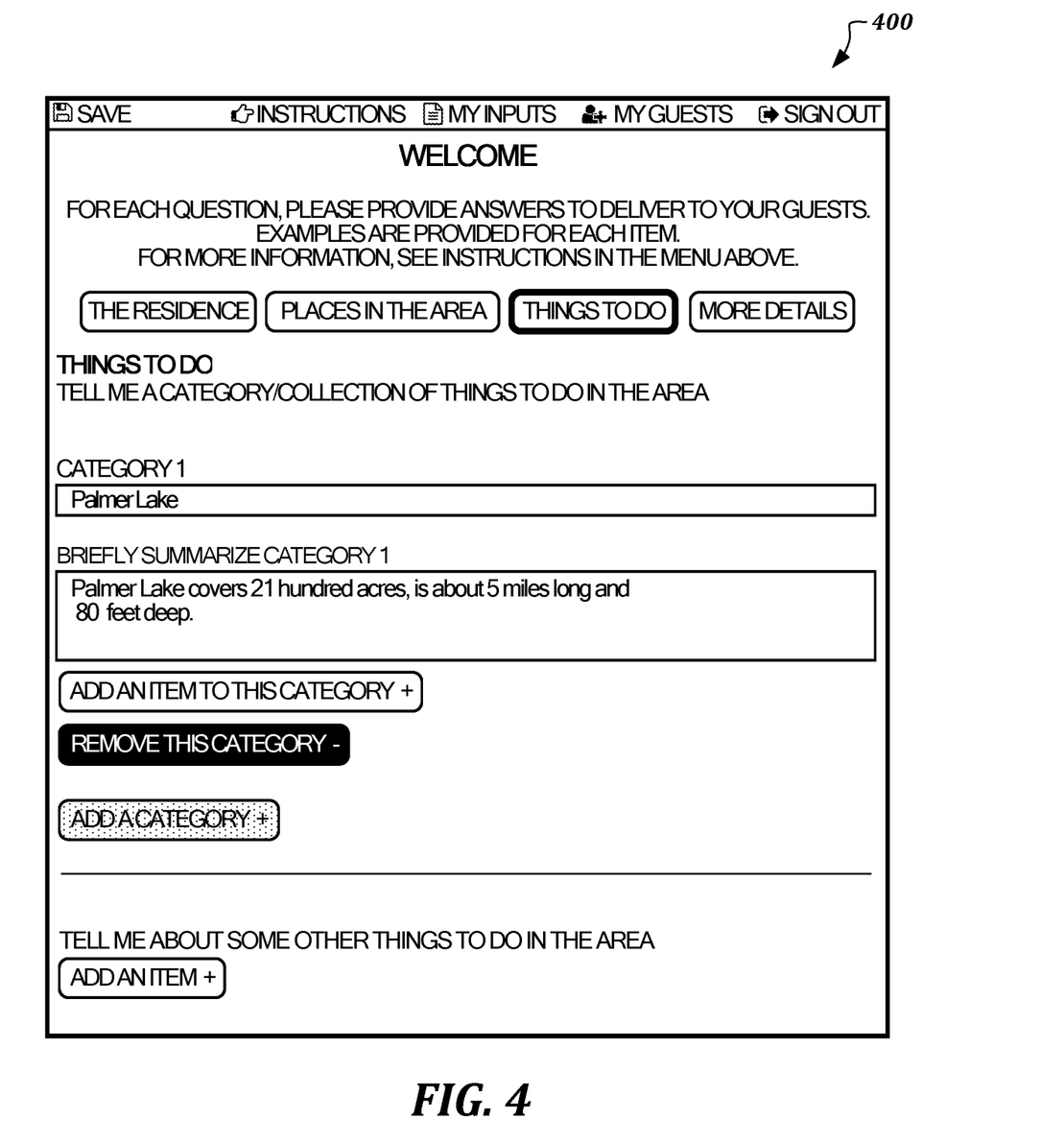
FIG. 4 is a screenshot diagram of another section of the illustrative user interface of FIG. 3.

FIG. 4 is a screenshot diagram of another section of the illustrative user interface of FIG. 3. The illustrative section shown in FIG. 4 includes fields relating to activities. This section includes elements (e.g., buttons) for indicating menu items to include or exclude in a customized implementation of the system. In this example, the field "Category 1" is currently included, with a button that can be activated to exclude that category, if desired. A button is provided to add a menu item in this category, if desired. Additional buttons are provided to add additional categories or menu items, if desired.

In the illustrative section shown in FIG. 4, the virtual assistant has not been previously trained for NLU of speech input corresponding to selection of Category 1. Instead, the virtual assistant uses other techniques that do not rise to the level of NLU to detect corresponding speech input. For example, the virtual assistant may use speech-to-text processing to convert the speech input to text and comparing the resulting text with the representation of the category or menu item.

In operation, the voice-based information retrieval system may represent Category 1 with a context-independent signifier, such as "one." In this scenario, the virtual assistant may say, "Things to do: Say 'one' for activities at Palmer Lake; say 'two' for more choices." The virtual assistant can then provide output in response to detection of speech input that matches the context-independent signifier. For example, in response to a user saying "one" in the example above, the virtual assistant may recite the text shown in the field titled "Briefly summarize category one" and then recite specific menu items in this category that may also be represented by context-independent signifiers (e.g., "say 'one' for canoeing; say 'two' for fishing; say 'three' for more choices").

Alternatively, the system may assign Category 1 to a custom signifier provided by the administrator. In this scenario, the voice-based information retrieval system may use a custom label provided by the administrator as the signifier, rather than a predetermined number or letter. In operation, the virtual assistant may use a statement of the form, "Would you like to hear about [Category 1] activities?" For example, if "Palmer Lake" is provided as a custom signifier for Category 1, the virtual assistant may say, "Things to do. Would you like to hear about Palmer Lake activities, or more choices?" The virtual assistant can then provide output in response to detection of speech input that matches the custom signifier. For example, the virtual assistant may use speech-to-text processing to convert speech input and determine whether the resulting text matches the custom signifier "Palmer Lake." If so, the virtual assistant may recite the text shown in the field titled "Briefly summarize category one" and then recite specific menu items represented by custom signifiers (e.g., "canoeing" or "fishing") that may be included in this category.

In at least one embodiment, a voice-based information retrieval system initially attempts NLU to determine if a user intended to select a particular menu item, and if that fails, the system invokes a fallback intent in which the system translates the spoken phrase into a text string and attempts to match the translated text string to a signifier, such as a custom signifier that was provided by the administrator as free-form text. In practice, the matching process may be simplified by removing features such as punctuation, capitalization, whitespace, or other information from the translated text string and the custom label text. For example, a custom label of "Mike's Bar-and-Grill" and a translated text string of "mikes bar and grill" can be both converted to "mikesbarandgrill" for matching purposes. In this way, the chance of a successful match can be increased.

Figure 5:
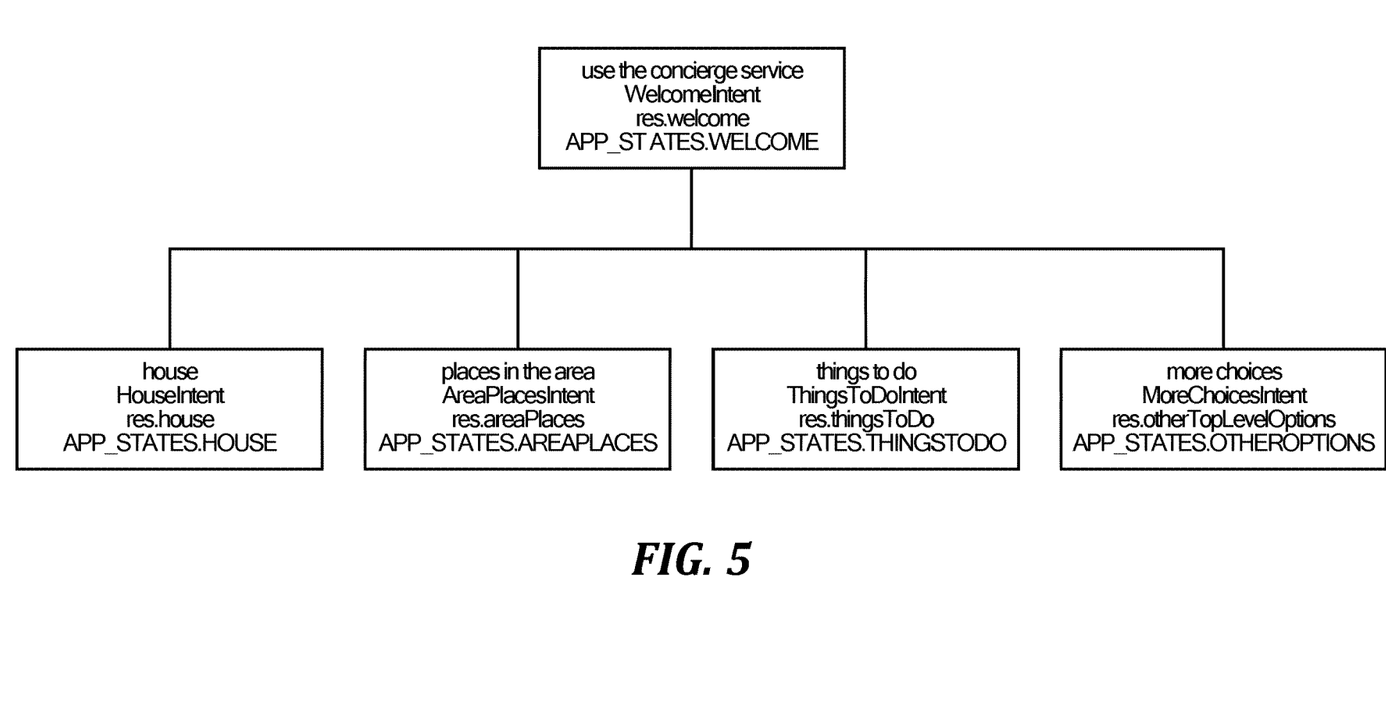
FIGS. 5 and 6 are diagrams depicting an illustrative menu tree that may be generated by an implementation of a voice-based information retrieval system.
Figure 6:
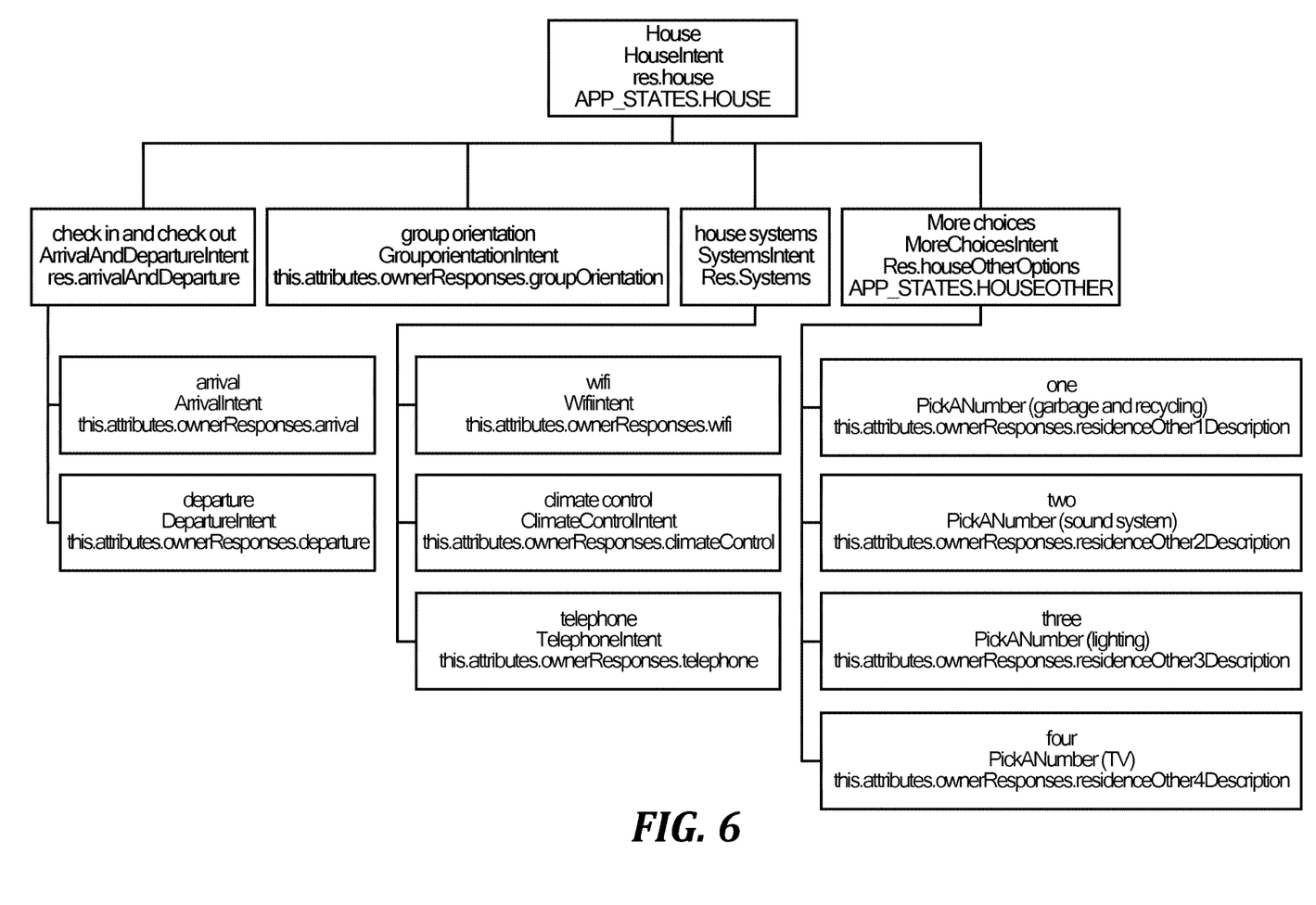

FIGS. 5 and 6 are diagrams depicting an illustrative menu tree that may be generated by an implementation of a voice-based information retrieval system in accordance with described embodiments. In FIG. 5, illustrative menu items are shown for which a virtual assistant may be trained for NLU of corresponding speech input. Each node in FIG. 5 includes a name for the menu item, a corresponding intent (e.g., "WelcomeIntent," "HouseIntent"), and a corresponding navigation state (e.g., "APP_STATES.WELCOME," "APP_STATES.HOUSE").

In FIG. 6, further menu items are shown for which a virtual assistant may be trained for NLU of corresponding speech input (e.g., "check in and check out," "group orientation," "house systems," "more choices"), while other items are shown for which a virtual assistant may not be trained for NLU of corresponding speech input. For example, under "more choices" are menu items such as "garbage and recycling," "sound system," "lighting," and "TV." These menu items are represented by context-independent signifiers ("one," "two," "three," and "four," respectively) that may be detected without NLU of the corresponding speech input. Nodes shown in FIG. 6 that do not specify a navigation state may inherit a navigation state from a parent node.

Referring again to FIG. 1, the data store 120 may be used to store contextual content and other data relating to specific implementations of a voice-based information retrieval system. In an illustrative embodiment, a database (e.g., a non-relational or NoSQL database) is used to store contextual content. The database includes a table with an item record for each specific use case. To retrieve a given item record, a primary key (Linkage Key) is provided. Each item record contains attributes shown in the table below.

| Item Record Attribute | Description |
| --- | --- |
| UserEmail | The Linkage Key. |
| UserName | Used to personalize the portal experience for an administrator. |
| ID | An user ID assigned by configuring a particular client device (e.g., a smart speaker). Used to determine which device is used by that administrator. |
| DataStructure | An identifier used internally by the portal software to track changes over time. |
| Responses | A collection of customized content (e.g., in Javascript Object Notation (JSON)). This includes all customized content in each item/description pair as well as information as to whether pairs are included or excluded. |

| Item Record Attribute | Description |
| --- | --- |
| ResponseStructure | A set of counters that store how many pairs are included by an administrator. For groups (e.g., categories) of pairs, this attribute may be used to expand or collapse levels of menu options presented to a user depending on the number of pairs in each group for a given use case. |

The Linkage Key provides a way for users to receive the correct content for their context. The Linkage Key can be used to link a specific device with specific content. In at least one embodiment, the Linkage Key is identified when a given client device is configured for use in a voice-based information retrieval system. During configuration, an administrator (e.g., a rental property owner) may be required to authenticate and authorize the use of information such as the administrator's name and email address in the process. These credentials can then be stored in the database. After configuration, the system can require the administrator to sign in to the portal using the same credentials. The administrator then provides custom content, which is associated with the Linkage Key.

In at least one embodiment, the Linkage Key is an email address. Alternatively, the Linkage Key may be a randomly generated token or some other unique identifier. When a user invokes the voice-based information retrieval system on a particular client device, the Linkage Key is made available to the virtual assistant, which dynamically imports the contextual content from the database in preparation for the conversation with the user.

Figure 7:
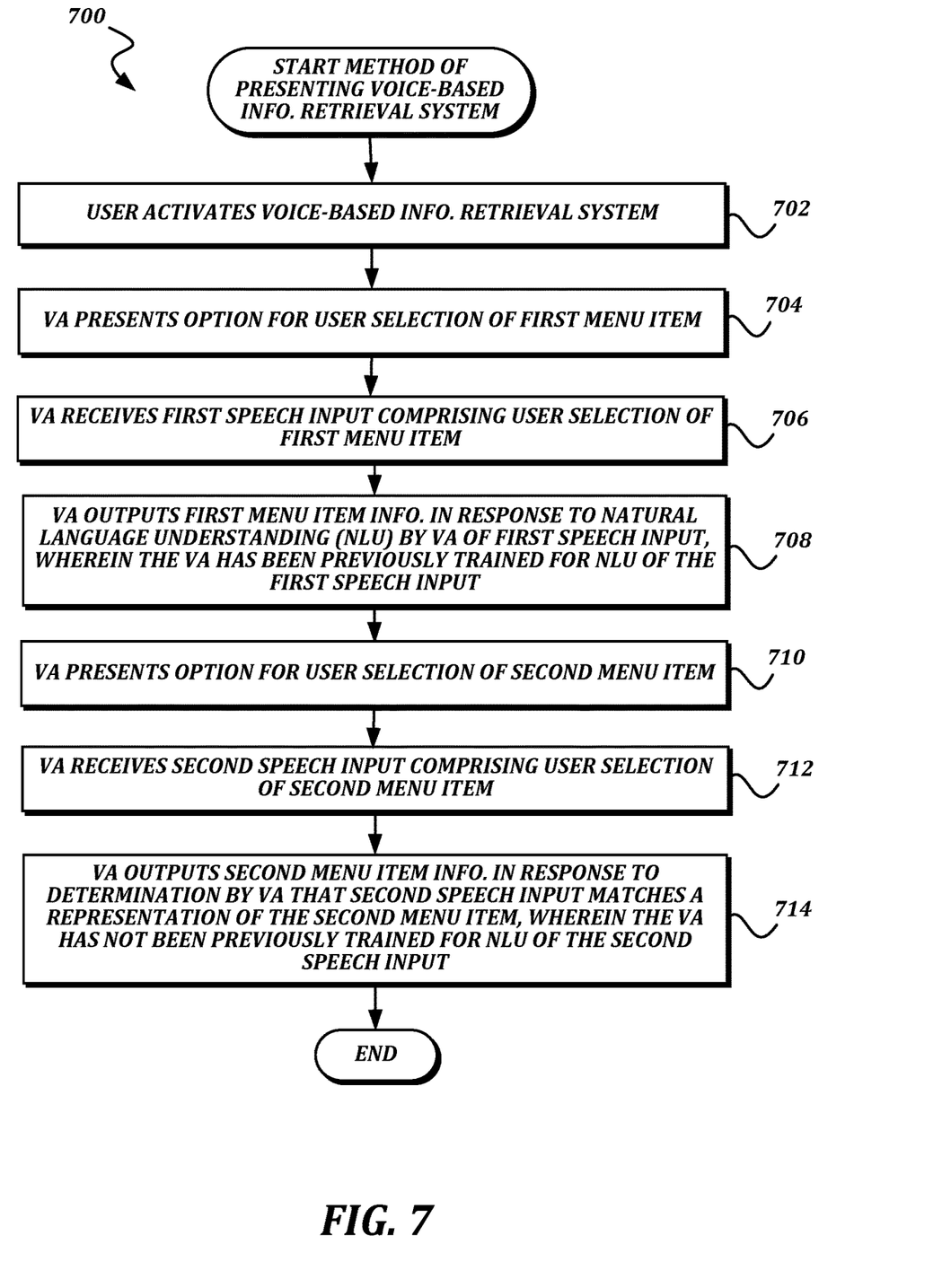
FIG. 7 is a flow chart of an illustrative process for presenting an implementation of a voice-based information retrieval system to a user.

FIG. 7 is a flow chart of an illustrative process for presenting an implementation of a voice-based information retrieval system to a user. The illustrative process 700 begins at step 702, in which a user activates a voice-based information retrieval system by interacting with a virtual assistant. For example, the user may speak a wake word to activate the virtual assistant, and then speak a command such as "start the virtual concierge" to activate the voice-based information retrieval system. At step 704, the virtual assistant presents options for user selection of a first menu item. For example, in the context of a vacation rental home, a virtual assistant may say, "Welcome. Would you like to hear about the house, places in the area, things to do, or more choices?"

At step 706, the virtual assistant receives first speech input comprising user selection of a first menu item. At step 708 the virtual assistant outputs information associated with selection of the first menu item in response to NLU of the first speech input, and at step 710 the virtual assistant presents options for user selection of a second menu item. The virtual assistant has been previously trained for NLU of the first speech input. For example, in response to the illustrative question above, if the user says "tell me something else" or "let me hear some more choices," the virtual assistant may say, "More choices: Say 'one' for garbage and recycling; say 'two' for sound system." In this example, the information associated with selection of the first menu item is a list of further options that are available under the first menu item. Alternatively, the virtual assistant may present other information associated with selection of a first menu item.

At step 712, the virtual assistant receives second speech input comprising user selection of a second menu item, and at step 714 the virtual assistant outputs information associated with the second menu item in response to a determination that the second speech input matches a representation of the second menu item. The virtual assistant has not been previously trained for NLU of the second speech input. For example, if the user says "one" in the example above, the virtual assistant may say, "Garbage and recycling: The bins are stored in the garage and should be left at the curb for pickup by 7 a.m. on Tuesday morning." The system may then return to the previous level in the menu, return to the top of the menu, await further input from the user, or take some other action. If there is no other action to be taken, the process may end.

Many alternatives to the process described above are possible. For example, although the steps of FIG. 7 may begin with a user activating a voice-based information retrieval system, a similar process may be performed in a scenario where the system is already active, and does not require specific activation by a user. As another example, the virtual assistant may be executed by any suitable computing device, such as a smart speaker, smart phone, or other computing device.

Illustrative Devices and Operating Environments

Unless otherwise specified in the context of specific examples, described techniques and tools may be implemented by any suitable computing device or set of devices.

In any of the described examples, an engine may be used to perform actions. An engine includes logic (e.g., in the form of computer program code) configured to cause one or more computing devices to perform actions described herein as being associated with the engine. For example, a computing device can be specifically programmed to perform the actions by having installed therein a tangible computer-readable medium having computer-executable instructions stored thereon that, when executed by one or more processors of the computing device, cause the computing device to perform the actions. The particular engines described herein are included for ease of discussion, but many alternatives are possible. For example, actions described herein as associated with two or more engines on multiple devices may be performed by a single engine. As another example, actions described herein as associated with a single engine may be performed by two or more engines on the same device or on multiple devices.

In any of the described examples, a data store contains data as described herein and may be hosted, for example, by a database management system (DBMS) to allow a high level of data throughput between the data store and other components of a described system. The DBMS may also allow the data store to be reliably backed up and to maintain a high level of availability. For example, a data store may be accessed by other system components via a network, such as a private network in the vicinity of the system, a secured transmission channel over the public Internet, a combination of private and public networks, and the like. Instead of or in addition to a DBMS, a data store may include structured data stored as files in a traditional file system. Data stores may reside on computing devices that are part of or separate from components of systems described herein. Separate data stores may be combined into a single data store, or a single data store may be split into two or more separate data stores.

Some of the functionality described herein may be implemented in the context of a client-server relationship. In this context, server devices may include suitable computing devices configured to provide information and/or services described herein. Server devices may include any suitable computing devices, such as dedicated server devices. Server functionality provided by server devices may, in some cases, be provided by software (e.g., virtualized computing instances or application objects) executing on a computing device that is not a dedicated server device. The term "client" can be used to refer to a computing device that obtains information and/or accesses services provided by a server over a communication link. However, the designation of a particular device as a client device does not necessarily require the presence of a server. At various times, a single device may act as a server, a client, or both a server and a client, depending on context and configuration. Actual physical locations of clients and servers are not necessarily important, but the locations can be described as "local" for a client and "remote" for a server to illustrate a common usage scenario in which a client is receiving information provided by a server at a remote location. Alternatively, a peer-to-peer arrangement, or other models, can be used.

Figure 8:
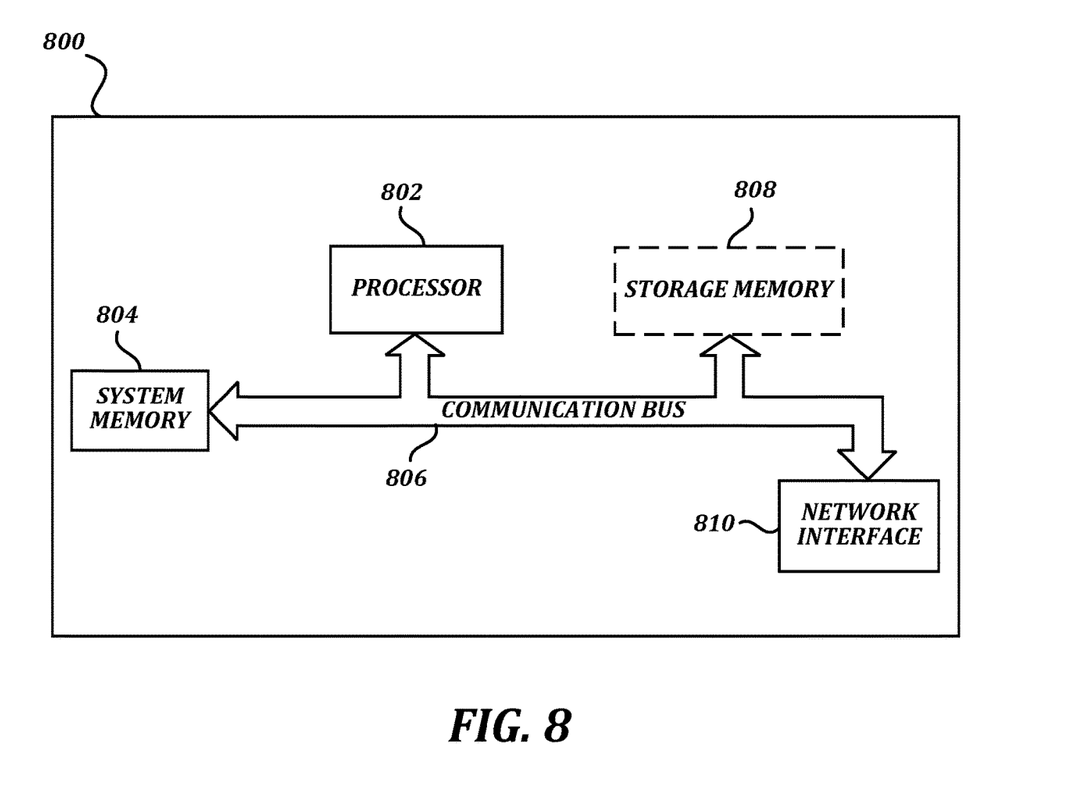
FIG. 8 is a block diagram that illustrates aspects of an illustrative computing device 800 appropriate for use in accordance with embodiments of the present disclosure.

FIG. 8 is a block diagram that illustrates aspects of an illustrative computing device 800 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 800 includes at least one processor 802 and a system memory 804 connected by a communication bus 806. Depending on the exact configuration and type of device, the system memory 804 may be volatile or nonvolatile memory, such as read only memory ("ROM"), random access memory ("RAM"), EEPROM, flash memory, or other memory technology. Those of ordinary skill in the art and others will recognize that system memory 804 typically stores data and/or program modules that are immediately accessible to and/or currently being operated on by the processor 802. In this regard, the processor 802 may serve as a computational center of the computing device 800 by supporting the execution of instructions.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, such as WiFi, 2G, 3G, 4G, LTE, WiMAX, Bluetooth, and/or the like.

In FIG. 8, the computing device 800 also includes a storage medium 808. However, services may be accessed using a computing device that does not include means for persisting data to a local storage medium. Therefore, the storage medium 808 depicted in FIG. 8 is optional. In any event, the storage medium 808 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like.

As used herein, the term "computer-readable medium" includes volatile and nonvolatile and removable and nonremovable media implemented in any method or technology capable of storing information, such as computer-readable instructions, data structures, program modules, or other data. In this regard, the system memory 804 and storage medium 808 depicted in FIG. 8 are examples of computer-readable media.

For ease of illustration and because it is not important for an understanding of the claimed subject matter, FIG. 8 does not show some of the typical components of many computing devices. In this regard, the computing device 800 may include input devices, such as a keyboard, keypad, mouse, trackball, microphone, video camera, touchpad, touchscreen, electronic pen, stylus, and/or the like. Such input devices may be coupled to the computing device 800 by wired or wireless connections including RF, infrared, serial, parallel, Bluetooth, USB, or other suitable connection protocols using wireless or physical connections.

In any of the described examples, input data can be captured by input devices and processed, transmitted, or stored (e.g., for future processing). The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 800 (e.g., a client device), or can be integral components of the computing device 800. In some embodiments, multiple input devices may be combined into a single, multifunction input device (e.g., a video camera with an integrated microphone). The computing device 800 may also include output devices such as a display, speakers, printer, etc. The output devices may include video output devices such as a display or touchscreen. The output devices also may include audio output devices such as external speakers or earphones. The output devices can be separate from and communicatively coupled to the computing device 800, or can be integral components of the computing device 800. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Extensions and Alternatives

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Although illustrative embodiments are described with reference to a voice-enabled smart speaker and a voice-based information retrieval system, it should be understood that the devices and systems described herein need not be limited to voice or audio input and output. An information retrieval system that responds to voice input may be considered "voice-based" without being strictly limited to voice input or voice output. Thus, suitable client devices and administrator devices may include smart phones or other computing devices with touchscreens, video display functionality, and other features. For client devices with video display capability, a user may be presented with video content such as a welcome video or an instructional video, e.g., in response to selection of menu options. The portal may be augmented to provide administrators the ability to upload images, videos, audio files, or other media as custom content. In addition, smart speakers with touchscreen and video display functionality are contemplated, as well as other user interface devices such as virtual reality devices, which may include headsets paired with corresponding handheld devices or other input/output devices. At a suitably configured client device, a user may be provided with ability to, for example, point to, swipe, tap, or use some other action or gesture to interact with images representing menu items (e.g., things to do in the area), either in place of or in combination with navigating and selecting items with voice input. Similar capabilities can be incorporated in an administrator device, to provide administrators with additional options for customizing the system and providing custom content. As with a voice interface, an enhanced user experience with visual, touch, or virtual reality aspects is possible without the complexity of reprogramming or retraining the information retrieval system, in accordance with principles described herein.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

Many alternatives to the user interfaces described herein are possible. In practice, the user interfaces described herein may be implemented as separate user interfaces or as different states of the same user interface, and the different states can be presented in response to different events, e.g., user input events. The user interfaces can be customized for different devices, input and output capabilities, and the like. For example, the user interfaces can be presented in different ways depending on display size, display orientation, whether the device is a mobile device, etc. The information and user interface elements shown in the user interfaces can be modified, supplemented, or replaced with other elements in various possible implementations. For example, various combinations of graphical user interface elements including text boxes, sliders, drop-down menus, radio buttons, soft buttons, etc., or any other user interface elements, including hardware elements such as buttons, switches, scroll wheels, microphones, cameras, etc., may be used to accept user input in various forms. As another example, the user interface elements that are used in a particular implementation or configuration may depend on whether a device has particular input and/or output capabilities (e.g., a touchscreen). Information and user interface elements can be presented in different spatial, logical, and temporal arrangements in various possible implementations. For example, information or user interface elements depicted as being presented simultaneously on a single page or tab may also be presented at different times, on different pages or tabs, etc. As another example, some information or user interface elements may be presented conditionally depending on previous input, user preferences, or the like.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method for customizing a voice-based information retrieval system for a virtual assistant, the method comprising:
    presenting a user interface for customizing an implementation of a voice-based information retrieval system for a virtual assistant with natural language understanding (NLU) functionality, wherein the implementation of the voice-based information retrieval system is associated with a linkage key;
    receiving first customization input associated with the linkage key via the user interface, wherein the first customization input comprises information to be outputted by the virtual assistant in response to NLU, by the virtual assistant, of a first speech input indicating selection of a first menu item in the implementation of the voice-based information retrieval system, and wherein the virtual assistant has been previously trained for NLU of the first speech input;
    receiving second customization input associated with the linkage key via the user interface, wherein the second customization input comprises a representation of a second menu item in the implementation of the voice-based information retrieval system and information to be outputted by the virtual assistant in response to detection, by the virtual assistant, of a second speech input that matches the representation of the second menu item, and wherein the virtual assistant has not been previously trained for NLU of the second speech input; and
    updating the implementation of the voice-based information retrieval system based on the received customization inputs, wherein the updating comprises including the first menu item, the second menu item, and the respective information to be outputted in the voice-based information retrieval system.

2. The method of claim 1, wherein the representation of the second menu item comprises free-form text input, and wherein the second speech input matches the free-form text input.

3. The method of claim 2, wherein the second speech input is matched with the free-form text input by translating the second speech input into text and comparing the translated text with the free-form text input.

4. The method of claim 1, wherein the representation of the second menu item comprises a letter or number, and wherein the second speech input is a spoken letter or number.

5. The method of claim 1, wherein the first menu item is a top-level menu item.

6. The method of claim 1, wherein the second menu item is a sub-item of the first menu item.

7. The method of claim 1, further comprising receiving additional customization input via the user interface, wherein the additional customization input corresponds to additional menu items in the implementation of the voice-based information retrieval system.

8. The method of claim 1, wherein the first speech input comprises a spoken phrase, sentence, or question.

9. The method of claim 1, wherein the second speech input comprises one or more spoken words.

10. The method of claim 1, wherein the virtual assistant is implemented in a mobile computing device.

11. The method of claim 10, wherein the mobile computing device is a smart phone.

12. The method of claim 1, wherein the virtual assistant is implemented in a voice-enabled speaker.

13. The method of claim 1, wherein the voice-based information retrieval system is implemented as a virtual concierge service for a hotel or rental property.

14. A non-transitory computer-readable medium comprising computer-executable instructions configured to cause one or more computing devices to:
present a user interface for customizing an implementation of a voice-based information retrieval system for a virtual assistant with natural language understanding (NLU) functionality, wherein the implementation of the voice-based information retrieval system is associated with a linkage key;
receive first customization input associated with the linkage key via the user interface, wherein the first customization input comprises information to be outputted by the virtual assistant in response to NLU, by the virtual assistant, of a first speech input indicating selection of a first menu item in the implementation of the voice-based information retrieval system, and wherein the virtual assistant has been previously trained for NLU of the first speech input;
receive second customization input via the user interface, wherein the second customization input comprises a representation of a second menu item in the implementation of the voice-based information retrieval system and information to be outputted by the virtual assistant in response to detection, by the virtual assistant, of a second speech input that matches the representation of the second menu item, and wherein the virtual assistant has not been previously trained for NLU of the second speech input; and
update the implementation of the voice-based information retrieval system based on the received customization inputs, wherein the updating comprises including the first menu item, the second menu item, and the respective information to be outputted in the voice-based information retrieval system.

15. The non-transitory computer-readable medium of claim 14, wherein the representation of the second menu item comprises free-form text input, and wherein the second speech input matches the free-form text input.

16. The non-transitory computer-readable medium of claim 14, wherein the representation of the second menu item comprises a letter or number, and wherein the second speech input is a spoken letter or number.

17. The non-transitory computer-readable medium of claim 14, wherein the computer-executable instructions are further configured to cause the one or more computing devices to receive additional customization input via the user interface, wherein the additional customization input corresponds to additional menu items in the implementation of the voice-based information retrieval system.

18. A computer system comprising one or more computing devices programmed to:
present a user interface for customizing an implementation of a voice-based information retrieval system for a virtual assistant with natural language understanding (NLU) functionality, wherein the implementation of the voice-based information retrieval system is associated with a linkage key;
receive first customization input associated with the linkage key via the user interface, wherein the first customization input comprises information to be outputted by the virtual assistant in response to NLU, by the virtual assistant, of a first speech input indicating selection of a first menu item in the implementation of the voice-based information retrieval system, and wherein the virtual assistant has been previously trained for NLU of the first speech input;
receive second customization input associated with the linkage key via the user interface, wherein the second customization input comprises a representation of a second menu item and information to be outputted by the virtual assistant in response to detection, by the virtual assistant, of a second speech input that matches the representation of the second menu item in the implementation of the voice-based information retrieval system, and wherein the virtual assistant has not been previously trained for NLU of the second speech input; and
update the implementation of the voice-based information retrieval system based on the received customization inputs, wherein the updating comprises including the first menu item, the second menu item, and the respective information to be outputted in the voice-based information retrieval system.

19. The computer system of claim 18, wherein the representation of the second menu item comprises free-form text input, and wherein the second speech input matches the free-form text input.

20. The computer system of claim 18, wherein the representation of the second menu item comprises a letter or number, and wherein the second speech input is a spoken letter or number.

* * * * *